(12) United States Patent
Kondo et al.

(10) Patent No.: US 6,644,559 B2
(45) Date of Patent: Nov. 11, 2003

(54) VEHICLE AIR CONDITIONER WITH FOOT AIR-OUTLET STRUCTURE

(75) Inventors: Hitoshi Kondo, Kariya (JP); Kouji Matsunaga, Kariya (JP); Shinya Kaneura, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/299,522

(22) Filed: Nov. 19, 2002

(65) Prior Publication Data

US 2003/0096571 A1 May 22, 2003

(30) Foreign Application Priority Data

Nov. 22, 2001 (JP) .......................... 2001-357444

(51) Int. Cl.[7] ................................. B60H 1/02
(52) U.S. Cl. .................... 237/12.3 B; 454/156; 454/121
(58) Field of Search ................ 454/156, 121, 454/126, 144; 237/12.3 C, 12.3 B, 12.3 R

(56) References Cited

U.S. PATENT DOCUMENTS

| | | | | |
|---|---|---|---|---|
| 5,106,018 A | * | 4/1992 | Loup | 237/12.3 B |
| 5,305,823 A | * | 4/1994 | Elliot | 165/41 |
| 5,884,689 A | * | 3/1999 | Takechi et al. | 165/43 |
| 5,960,859 A | * | 10/1999 | Sakurai | 165/43 |
| 6,045,444 A | * | 4/2000 | Zima et al. | 454/121 |
| 6,048,263 A | | 4/2000 | Uchida et al. | |
| 6,397,942 B1 | * | 6/2002 | Ito et al. | 165/203 |
| 6,482,081 B2 | * | 11/2002 | Vincent et al. | 454/121 |

\* cited by examiner

*Primary Examiner*—Derek Boles
(74) *Attorney, Agent, or Firm*—Harness, Dickey & Pierce, PLC

(57) ABSTRACT

In a vehicle air conditioner, a heater core is disposed in an air conditioning case to heat air so that conditioned air is obtained. The air conditioning case has a rear wall surface extending substantially in a vehicle width direction and in a vertical direction, and a foot opening portion is provided in the wall surface at an upper side position of the heater core to extend in an entire width dimension of the wall surface in the vehicle width direction. A foot air duct is connected to the wall surface around the foot opening portion, and extends downwardly to be tilted toward right and left sides. Foot air outlets are provided at a bottom end of the foot air duct to be opened downwardly. Thus, a flow resistance in a foot air-outlet passage can be reduced, and air can be uniformly blown toward a foot area.

23 Claims, 9 Drawing Sheets

VEHICLE AIR CONDITIONER WITH FOOT AIR-OUTLET STRUCTURE

CROSS REFERENCE TO RELATED APPLICATION

This application is based on Japanese Patent Application No. 2001-357444 filed on Nov. 22, 2001, the disclosure of which is incorporated herein by reference.

BACKGROUND OF THE INVENTION

1. Field of the Invention

The present invention relates to a vehicle air conditioner with a foot air-outlet structure for blowing conditioned air toward a passenger's foot area in a passenger compartment.

2. Description of Related Art

In a vehicle air conditioner shown in FIGS. 8 and 9, an air conditioning case 111 is disposed in a passenger compartment on a front side at an approximate center in a vehicle width direction, and a heater core 113 for heating air is disposed in the air conditioning case 111. Right and left foot openings 125 through which conditioned air (mainly warm air) is introduced toward a foot area in the passenger compartment are provided, respectively, in right and left side surfaces of the air conditioning case 111. Further, the right and left foot opening portions 125 are connected to right and left foot air ducts 131, so that conditioned air is blown from the foot air outlets 131a, 131b at lower ends of the foot air ducts 131. However, in the air conditioning case 111, conditioned air having passed through the heater core 113 flows from an upper side of the heater core 113 downwardly as shown by the arrow A in FIGS. 8 and 9, and flows into the foot openings 125 opened in the right and left side surfaces. Thereafter, conditioned air flows into the foot air ducts 131 from the foot openings 125. Because a tilt surface is formed in each foot air duct 131, conditioned air introduced into the foot air duct 131 collides with the tilt surface so that the flow direction of conditioned air is turned downwardly as shown by the arrow B in FIG. 8. That is, in the vehicle air conditioner shown in FIGS. 8 and 9, because the flow direction of conditioned air turns by right angle at two positions, flow resistance of conditioned air flowing into the foot air outlets 131a, 131b is increased, and a flow amount of conditioned air blown toward the foot area in the passenger compartment is relatively reduced. Further, because conditioned air is blown from the foot air outlets 131a, 131b after colliding with the tilt surface of the foot duct 131, conditioned air cannot be uniformly blown toward the foot area in each of right and left seat sides. For example, conditioned air tends to flow toward the left side of the foot area in a right seat, and tends to flow toward the right side of the foot area in the left seat.

SUMMARY OF THE INVENTION

In view of the above-described problems, it is an object of the present invention to provide a vehicle air conditioner in which a flow distribution of conditioned air blown toward a foot area can be made uniform in each of right and left seats of a passenger compartment while a flow resistance of conditioned air to be blown toward the foot area can be reduced.

It is another object of the present invention to provide an air conditioner which can be readily mounted on a vehicle while conditioned air is uniformly blown toward the foot area in each of the right and left seats of the passenger compartment.

According to the present invention, in a vehicle air conditioner, an air conditioning case for defining an air passage has a wall surface extending in a vehicle width direction, the wall surface has an air opening portion at an upper side position, from which air in the air conditioning case is taken out toward a lower side in the passenger compartment. In the air conditioner, an air duct defining a foot passage through which air from the air opening portion flows toward the lower side of the passenger compartment is connected to the wall surface at the air opening portion to communicate with the air opening portion, and has right and left tilt portions that extend downwardly to be tilted toward right and left sides in the vehicle width direction. The right and left tilt portions have lower end openings used as foot air outlets from which air introduced into the air duct is blown toward the lower side in the passenger compartment. Accordingly, conditioned air flows from the air opening portion at the upper side position of the wall surface downwardly toward the right and left sides along the air duct, and is blown toward the foot area of the passenger compartment from the air outlets. Thus, air can be uniformly distributed to the right and left sides of the foot area in each front seat of the passenger compartment, and air flow resistance can be reduced.

Preferably, the air opening portion is provided in the wall surface at an upper side of a heating heat exchanger to be elongated in an entire area of the air conditioning case in the vehicle width direction. Therefore, the air flow resistance can be further reduced, and air can be smoothly introduced into the air duct through the air opening portion.

When the air conditioning case is disposed at an approximate center in the vehicle width direction at a front portion in the passenger compartment such that air flows in the air conditioning case from a vehicle front side toward a vehicle rear side, the wall surface is a rear side surface of the air conditioning case. In this case, conditioned air can be readily flows into the air duct, and the air flow resistance can be further reduced.

Preferably, the air duct has a connection portion connected to the wall surface to communicate with the air opening portion. Further, the right and left tilt portions are connected to the connection portion, and are branched from each other to be tilted toward the right and left sides relative to a vertical direction. Therefore, conditioned air can be smoothly flows through the air duct toward the foot area of the passenger compartment. Thus, air can be uniformly blown toward the foot area without increasing the size of the vehicle air conditioner.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 1:
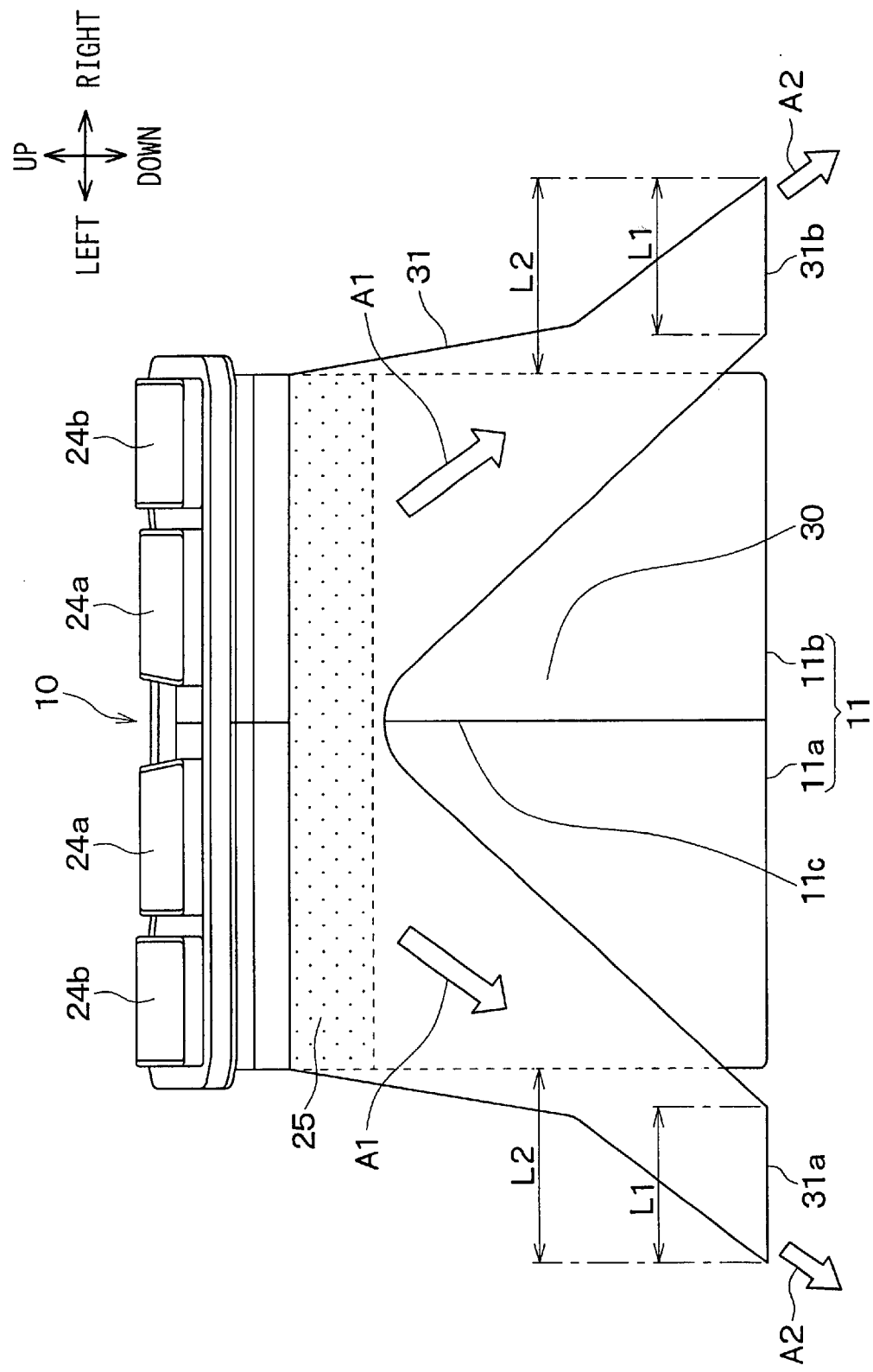
FIG. 1 is a schematic front view showing an air conditioning unit of a vehicle air conditioner according to a first preferred embodiment of the present invention.

A first preferred embodiment of the present invention will be now described with reference to FIGS. 1–3. An air conditioner for a vehicle includes an air conditioning unit 10, and a blower unit for blowing air to the air conditioning unit 10. FIG. 1 is a front view of the air conditioning unit 10 when being viewed from a vehicle rear side of the air conditioning unit 10. FIG. 3 shows an arrangement state of the air conditioning unit 10 in a passenger compartment. In FIG. 3, S1, S2 show the left and right front seats, and S3 shows a rear seat in the passenger compartment. As shown in FIG. 3, the air conditioning unit 10 is disposed at an approximate center in a vehicle right-left direction, inside an instrument panel in the passenger compartment of the vehicle. The blower unit is disposed in the passenger compartment at an offset position to be offset from the air conditioning unit 10 toward a front passenger's seat side in the vehicle right-left direction, for example.

The blower unit has an inside/outside air switching box and a blower. The inside/outside air switching box includes an outside air introduction port for introducing outside air (i.e., air outside the passenger compartment) and an inside air introduction port for introducing inside air (i.e., air inside the passenger compartment). The outside air introduction port and the inside air introduction port are opened and closed by an inside/outside air switching door. The blower for blowing air toward the air conditioning unit 10 is a centrifugal blower, for example.

The air conditioning unit 10 includes an evaporator (i.e., cooling heat exchanger) 12 and a heater core (i.e., heating heat exchanger) 13 which are integrally accommodated in a single air conditioning case 11. The air conditioning case 11 is made of resin which has an elasticity to some degree and is superior in a strength, such as polypropylene. The air conditioning case 11 is composed of left and right division cases 11a, 11b which are integrally connected by a fastening member at a division surface 11c, after the evaporator 12, the heater core 13 and components such as doors are accommodated therein.

Figure 2:
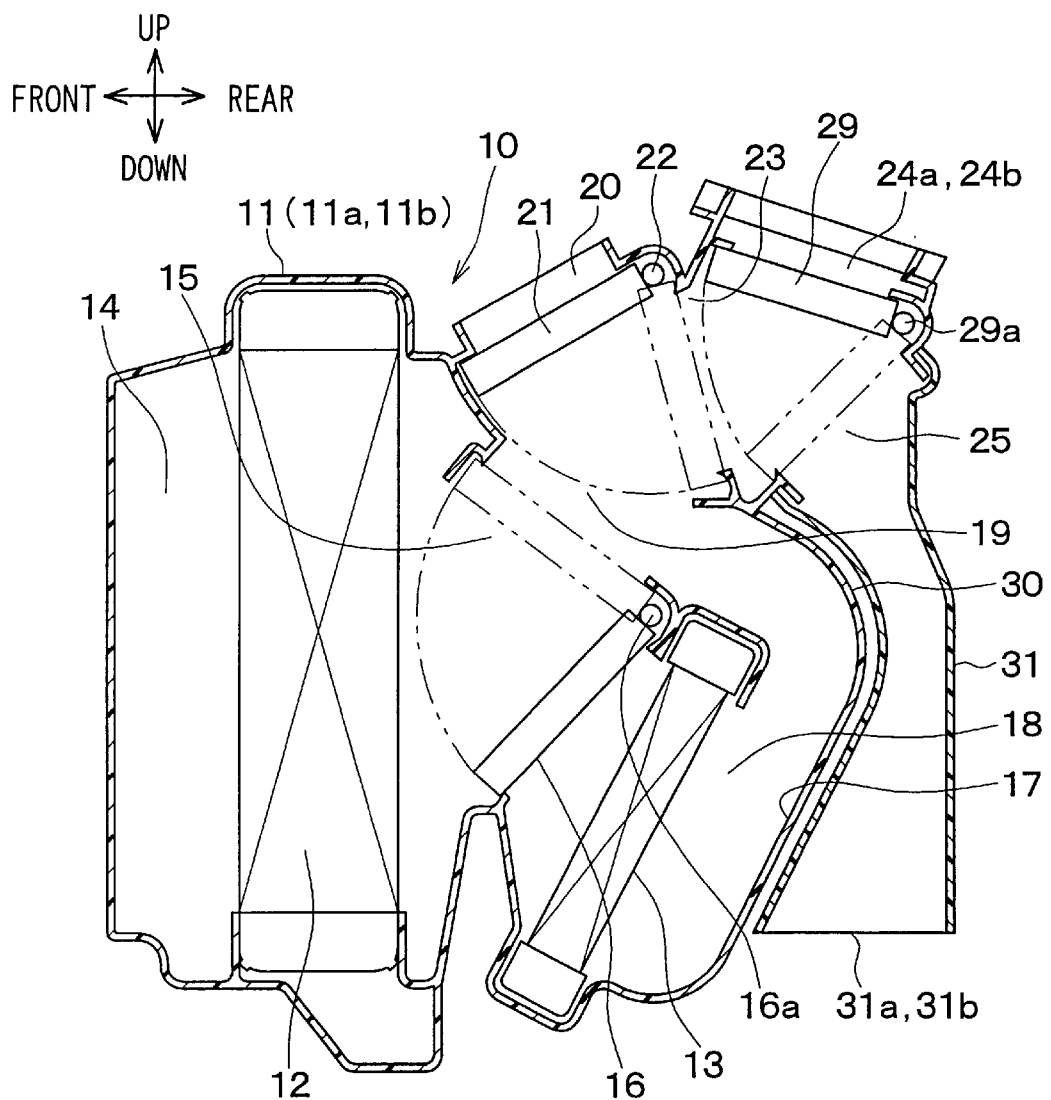
FIG. 2 is a schematic sectional view showing the air conditioning unit in FIG. 1.
Figure 3:
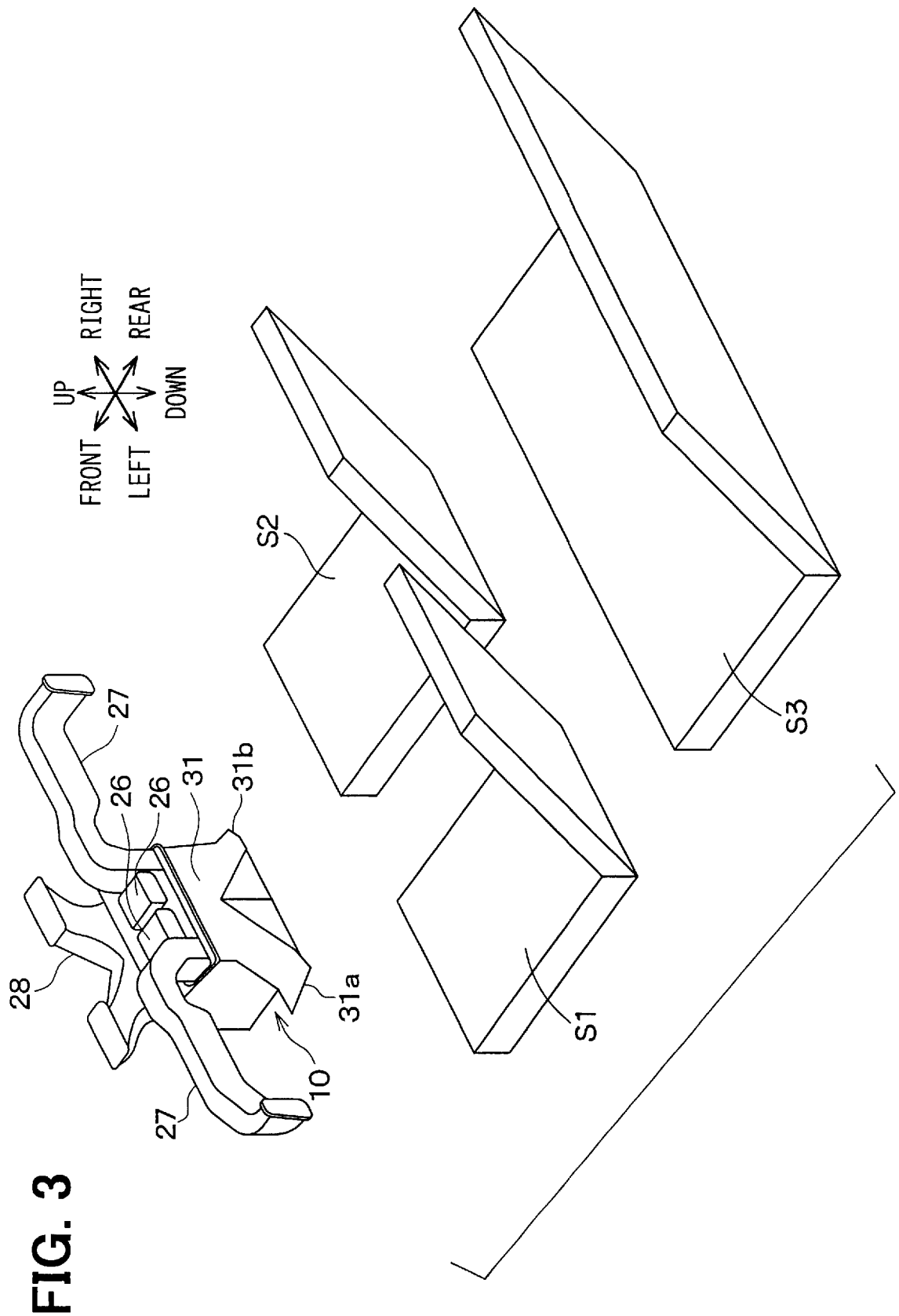
FIG. 3 is a schematic perspective view showing a mounting structure of the air conditioning unit in a passenger compartment, according to the first embodiment.

The air conditioning unit 10 is disposed inside the instrument panel in the passenger compartment, and is arranged as shown in FIG. 2 in a vehicle front-rear direction and in a vehicle up-down direction. An air inlet 14 into which air from the blower unit flows is provided in the air conditioning case 11 at a most vehicle front side.

The evaporator 12 is disposed within the air conditioning case 11 at an immediately downstream side of the air inlet 14. The evaporator 12 is thin in the vehicle front-rear direction, and is disposed in the air conditioning case 11 to cross an air passage in such a manner that a longitudinal direction thereof extends in the vehicle up-down direction.

As being known well, the evaporator 12 cools air in the air conditioning case 11 by absorbing an evaporation latent heat of refrigerant in a refrigerant cycle from the air.

The heater core 13 is disposed in the air conditioning case 11 on a downstream side of the evaporator 12 to form a predetermined distance between the evaporator 12 and the heater core 13. The heater core 13 is disposed on a lower side within the air conditioning case 11 to be inclined from the vehicle up-down direction toward a vehicle rear side. The heater core 13 heats air having passed through the evaporator 12 by using hot water (engine-cooling water) flowing therein as a heating source. A cool air bypass passage 15 through which air having passed through the evaporator 12 bypasses the heater core 13 is provided at an upper side of the heater core 13 within the air conditioning case 11.

A plate-like air mixing door 16 (front air mixing door) for adjusting temperature of air blown toward the front seat side of the passenger compartment is disposed between the heater core 13 and the evaporator 12. The air mixing door 16 adjusts a ratio between an amount of air passing through a heat-exchange core portion of the heater core 13 and an amount of air passing through the cool air bypass passage 15 while bypassing the heater core 13, so that the temperature of air blown into the passenger compartment can be adjusted. The air mixing door 16 is rotated around a rotation shaft 16a.

A wall member 17 extending in the up-down direction is formed integrally with the air conditioning case 11 at a downstream side (vehicle rear side) of the heater core 13 to form a predetermined distance between the heater core 13 and the wall member 17. Therefore, a warm air passage 18 extending upwardly from an immediately downstream side of the heater core 13 is defined by the wall member 17.

A downstream air side (upper side) of the warm air passage 18 and a downstream air side of the cool air bypass passage 15 are joined at an upper side of the heater core 13 in an air mixing chamber 19 where cool air from the cool air bypass passage 15 and warm air from the warm air passage 18 are mixed.

A defroster opening portion 20 is opened in an upper wall surface of the air conditioning case 11 at a position adjacent to the air mixing portion 19 so that conditioned air is introduced into the defroster opening portion 20 from the air mixing chamber 19. The defroster opening portion 20 is opened and closed by a plate-like defroster door 21, and the defroster door 21 is rotated by a rotation shaft 22 disposed horizontally at a position proximate to the upper wall surface of the air conditioning case 11. The defroster door 21 is disposed to open and close the defroster opening portion 20 and a communication port 23. The communication port 23 is provided for introducing conditioned air from the air mixing chamber 19 to face opening portions 24a, 24b and a foot opening portion 25.

Two center face opening portions 24a and two side face opening portions 24b are provided on the upper wall surface of the air conditioning case 11 at a vehicle rear side from the defroster opening portion 25. The two center face opening portions 24a communicate with center face air outlets provided on an upper center area of the instrument panel, through face air ducts shown in FIG. 3, so that conditioned air is blown toward the upper side of a passenger on a front seat in the passenger compartment.

The two side face opening portions 24b positioned at left and right sides of the center face openings 24a communicate with side face air outlets provided on upper side areas of the instrument panel, through side face ducts 27 shown in FIG. 3, so that conditioned air is blown toward the right and left upper sides in the passenger compartment. Further, the defroster opening portion 20 communicates with defroster air outlets provided on the upper side of the instrument panel through a defroster duct 28 shown in FIG. 3, so that conditioned air is blown toward an inner surface of a windshield of the vehicle.

The face opening portions 24a, 24b and the foot opening portion 25 are opened and closed by a foot/face switching door 29. The foot/face switching door 29 is a plate like door rotatable around a rotation shaft 29a.

The foot opening portion 25 is provided in the air conditioning case 11 on a lower side of the face opening portions 24a, 24b. Specifically, the foot opening portion 25 is provided in a rear wall surface 30 extending in the vehicle width direction. As shown in FIG. 1, the foot opening portion 25 is positioned at an upper side portion of the rear wall surface 30 upper than the heater core 13 on a vehicle rear side in the air conditioning case 11. In FIG. 1, an opening area of the foot opening portion 25 is indicated by a dotted area. The rear wall surface 30 extends in the vehicle width direction and in the vehicle up-down direction, and the foot opening portion 25 is opened approximately in an entire area at the upper side position of the rear wall surface 30 in the air conditioning case 11.

The foot opening portion 25 provided in the rear wall surface 30 is connected to a top end portion of a foot air duct 31, so that conditioned air introduced into the foot opening portion 25 flows through the foot air duct 31. The foot air duct 31 is made of resin, and is formed into a reverse V shape as shown in FIG. 1. The foot air duct 31 has two leg portions (tilt portions) extending from the upper side position of the rear wall surface 30 downwardly to be tilted toward right and left sides, as shown in FIG. 1. The foot air duct 31 has foot air outlets 31a, 31b at lower opening ends of the left and right leg portions, so that conditioned air is blown toward the foot area of the front seat in the passenger compartment from the foot air outlets 31a, 31b. For example, a dimension L1 of each foot air outlet 31a, 31b in the vehicle width direction is about 80 mm. Each of the foot air outlet 31a, 31b is positioned outside from left and right side surfaces of the air conditioning case 11 in the vehicle width direction by a predetermined dimension L2, and the predetermined dimension L2 is about 120 mm, for example.

In the air conditioning case 11 defining an air passage, air introduced from the air inlet 14 at the most front side passes through the evaporator 12 and the heater core 13 from the vehicle front side toward the vehicle rear side, and flows toward the plural air opening portions 20, 24a, 24b, 25 positioned at upper-rear sides in the air conditioning case 11.

Next, operation of the air conditioner according to the first embodiment of the present invention will be now described. When a face air outlet mode is set, the defroster door 21 is rotated to fully close the defroster opening portion 20 and to fully open the communication port 23. Further, the foot/face switching door 29 is rotated to fully close the foot opening portion 25 and to fully open the face opening portions 24a, 24b. In this case, when the air mixing door 16 is rotated to the solid line position in FIG. 2, a maximum cooling is set so that the air passage of the heater core 13 is closed and the cool air bypass passage 15 is fully opened. In this case, when the blower unit and the refrigerant cycle are operated, air blown by the blower unit flows into the air conditioning case 11 from the air inlet 14, and is cooled by the evaporator 12. During the maximum cooling, air cooled by the evaporator 12 passes through the cool air bypass passage 15 and the air mixing chamber 19, flows toward the face opening portions 24a, 24b through the communication port 23, and is blown toward the upper side of the passenger on the front seat in the passenger compartment from the face air outlets.

When the air mixing door 16 is operated from the solid line position (maximum cooling position) in FIG. 2 to a predetermined opening position to control temperature of air blown into the passenger compartment, air having passed through the evaporator 12 is introduced into both the cool air bypass passage 15 and the air passage of the heater core 13 in accordance with the rotation position of the front air mixing door 16. Air from the cool air bypass passage 15 and air from the warm air passage 18 are mixed in the air mixing chamber 19 so that conditioned air having a predetermined temperature is obtained in the air mixing chamber 19.

When a foot air outlet mode is set, the defroster opening portion 20 is slightly opened, and the communication port 23 is largely opened. During the foot air outlet mode, a flow ratio of the air amount from the defroster opening portion 20 to the air amount from the foot opening portion 25 is generally set to about 2/8. However, by increasing the opening degree of the defroster opening portion 25, the flow ratio of the air amount from the defroster opening portion 20 to the air amount from the front foot opening portion 25 can be set to approximately 5/5. That is, by increasing the opening degree of the defroster opening portion 20, a foot/defroster air outlet mode can be set from the foot air outlet mode so that defrosting performance is improved. In the foot air outlet mode, the foot/face switching door 29 fully opens the foot opening portion 25 and fully closes the face opening portions 24a, 24b.

Accordingly, in the foot air outlet mode, a small part of conditioned air from the air mixing portion 19 is blown toward the inner surface of the windshield from the defroster air outlets after passing through the defroster opening portion 20 so that defrosting effect of the windshield can be obtained. Simultaneously, a large part of conditioned air from the air mixing portion 19 flows into the foot air duct 31 through the communication port 23 and the foot opening portion 25. Thus, conditioned is blown toward the foot area of the front seat in the passenger compartment from the foot air outlets 31a, 31b opened at the lower ends of the leg portions of the foot air duct 31.

When a bi-level air outlet mode is set, the defroster door 21 closes the defroster opening portion 20, and the foot/face switching door 29 is rotated to a predetermined opening position to open both of the face opening portions 24a, 24b and the foot opening portion 25.

When a defroster air outlet mode is set, the defroster opening portion 20 is fully opened, and the communication port 23 is closed by the defroster door 21.

Next, advantage of the first embodiment will be described in the foot air outlet mode. In the first embodiment, the foot opening portion 25 is provided in the air conditioning case 11 so that conditioned air is taken out from the air conditioning case 11 through the foot opening portion 25. The foot opening portion 25 is opened at the upper side position in the rear wall surface 30 of the air conditioning case 11 in an entire area in the vehicle width direction of the air conditioning case 11, as shown by the dotted area in FIG. 1. Further, the foot air duct 21 is disposed on the rear wall surface 30 so that the top end portion of the foot air duct 31 is connected to the foot opening portion 25 of the air conditioning case 11 to communicate with the foot opening portion 25. Accordingly, air, flowing through the air passage in the air conditioning case 11 from the vehicle front side toward the vehicle rear side, flows in the vehicle width direction from the foot opening portion 25 provided in the rear wall surface 30, and directly flows into the foot air duct 31 from the foot opening portion 25. Conditioned air (warm air) flowing into the foot air duct 31 flows through the leg portions tilted gradually downwardly toward the right and left sides, and is blown toward the foot area in the passenger compartment from the foot air outlets 31a, 31b provided at the lower opening ends of the leg portions of the foot air duct 31. Thus, the flow direction of conditioned air can be slowly changed in the foot air passage, and a flow resistance in the foot air passage can be greatly reduced as compared with a case where the flow direction of air is changed by an approximate right angle. As a result, in the foot air outlet mode or the foot/defroster air outlet mode, heating performance can be effectively improved.

According to the first embodiment of the present invention, air flows toward slantingly downwardly toward left and right outsides along the shape of the foot air duct 31 as shown by the arrow A1 in FIG. 1, from the upper side position of the rear wall surface 30, where the foot opening portion 25 is positioned. Therefore, conditioned air blown from the foot air outlets 31a, 31b at the lower opening ends of the leg portions of the foot air duct 31 is also blown slantingly downwardly toward the left and right outsides along the direction shown by the allow A1, as shown by the allow A2 in FIG. 1. As a result, air blown from the foot air outlets 31a, 31b can be uniformly distributed toward the right and left feet in each of the left and right front seats.

According to the first embodiment of the present invention, the conditioned air can be blown slantingly toward left and right outsides in the vehicle width direction from the foot air outlets 31a, 31b. Therefore, conditioned air can be blown uniformly toward both the right and left foot sides in each of the right and left seats, and the two feet of the passenger can be uniformly heated.

In the first embodiment, when the protrusion dimension L2 of the foot air duct 31 from the air conditioning case 11 toward the right and left sides is set at a dimension about 120 mm, the uniform air distribution performance can be remarkably improved.

Figure 4:
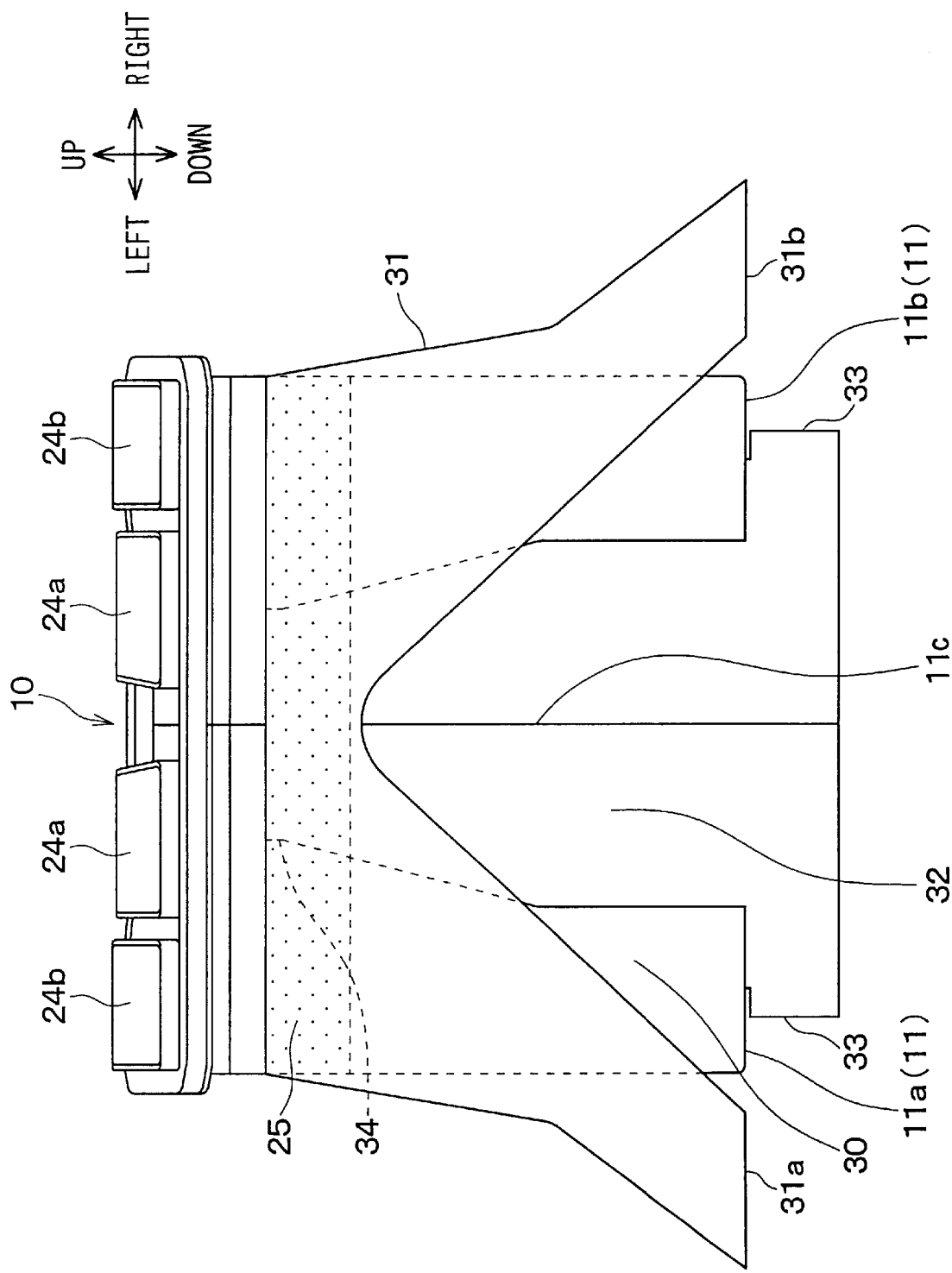
FIG. 4 is a schematic front view showing an air conditioning unit of a vehicle air conditioner according to a second preferred embodiment of the present invention.
Figure 5:
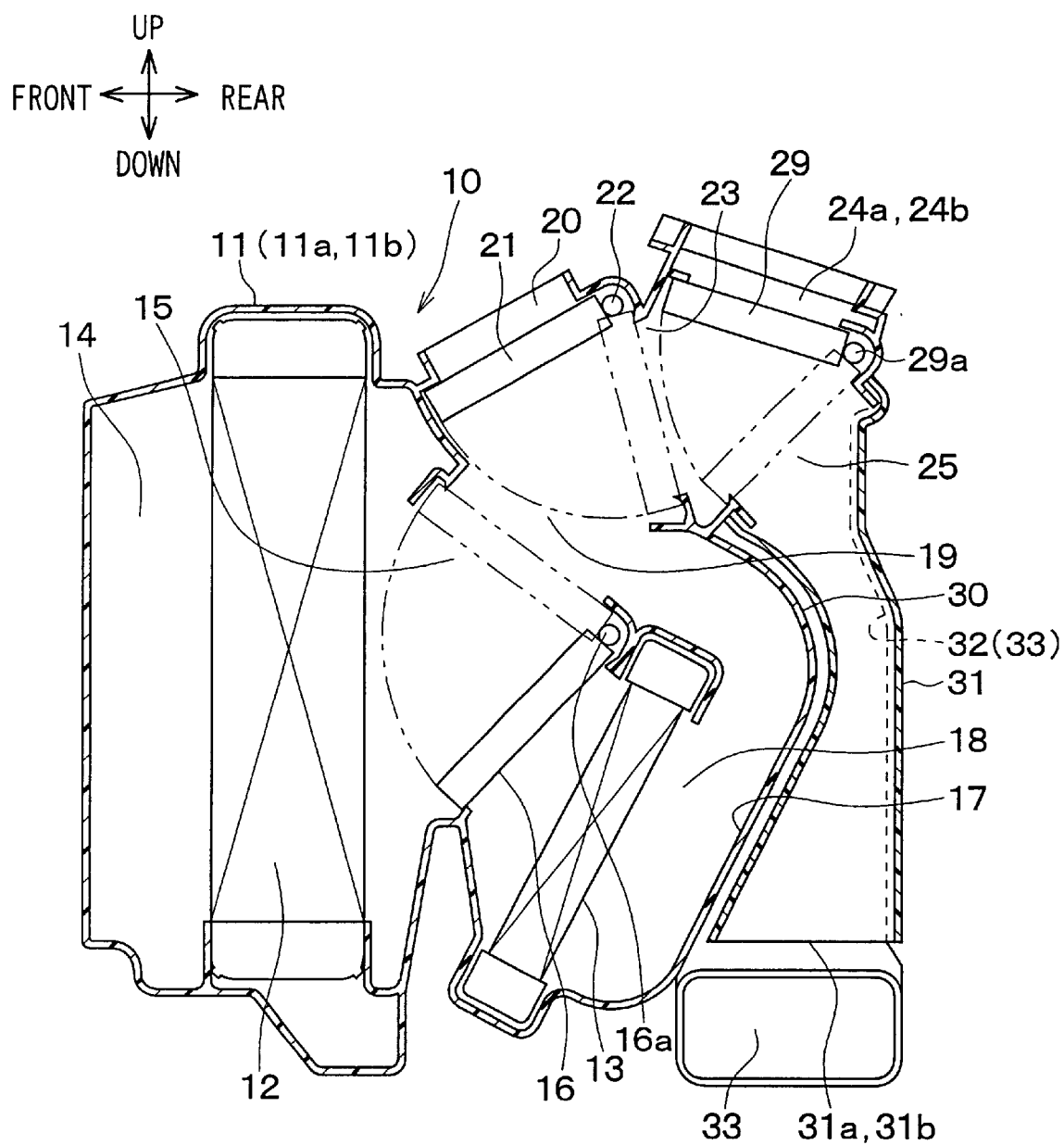
FIG. 5 is a schematic sectional view showing the air conditioning unit in FIG. 4.

A second preferred embodiment of the present invention will be now described with reference to FIGS. 4 and 5. In the second embodiment, a protrusion wall portion 32 protruding from a center area of the rear wall surface 30 in the vehicle width direction toward a vehicle rear side is integrally formed with the air conditioning case 11. Therefore, a rear foot air passage is provided between the protrusion wall portion 32 and the rear wall surface 30. The bottom end portion of the protrusion wall portion 32 is positioned under the bottom portion of the rear wall surface 30 of the air conditioning case 11, and rear foot opening portions 33 are provided at left and right end portions in a bottom end portion of the protrusion wall portion 32. The rear foot opening portions 33 are connected to rear foot air outlets through rear foot air ducts, so that conditioned air can be blown toward the foot area in the rear seat from the rear foot air outlets.

An air introduction port 34 for introduction air into the rear air passage is opened in the front foot air duct 31. A top end portion of the protrusion wall portion 32 is connected to the introduction port 34, so that air in the front foot opening portion 25 at a center area in the vehicle width direction flows into the rear foot air outlets 33 after being branched to the right and left sides.

In the second embodiment, the other parts of the vehicle air conditioner are similar to those of the above-described first embodiment.

A third preferred embodiment of the present invention will be now described with reference to FIGS. 6 and 7. In the third embodiment, the foot opening portion 25 and the foot air duct 31 described in the above-described first embodiment of the present invention is used for an air conditioning unit 10 where the air temperature blown into the front seat side and the air temperature blown into the rear seat side can be independently controlled.

In the third embodiment, different parts different from the above-described embodiments are mainly described. As shown in FIGS. 7, a partition member 35 is disposed at an upstream air position of a heat-exchanging core portion of the heater core 13 within the air conditioning case 11, so that the air passage of the core portion of the heater core 13 is partitioned into a front passage 36 and a rear passage 37 by the partition member 35. The partition member 35 is disposed at the upstream air position of the heater core 13 to extend in an entire length of an inner space of the air conditioning case 11 in the vehicle width direction. Further, a front cool air bypass passage 15 and a rear cool air bypass passage 38 through which cool air bypasses the heater core 13 are formed at upper and lower sides of the heater core 13 in the air conditioning case 11, respectively.

A front air mixing door 16 is rotatably disposed between the evaporator 12 and the heater core 13 so that the temperature of air blown toward the front seat side in the passenger compartment can be adjusted. Specifically, the front air mixing door 16 adjusts a ratio between a flow amount of air passing through the front passage 36 of the core portion of the heater core 13 and a flow amount of air passing through the front cool air bypass passage 15 while bypassing the heater core 13. A rear air mixing door 39 is rotatably disposed between the evaporator 12 and the heater core 13 so that the temperature of air blown toward the rear seat side in the passenger compartment can be adjusted. Specifically, the rear air mixing door 39 adjusts a ratio between a flow amount of air passing through the rear passage 37 of the core portion of the heater core 13 and a flow amount of air passing through the rear cool air bypass passage 38 while bypassing the heater core 13.

The front air mixing door 16 is integrally connected to a rotation shaft 16a to be independently rotated around the rotation shaft 16a, and the rear air mixing door 39 is integrally connected to a rotation shaft 39a to be independently rotated around the rotation shaft 39a. Therefore, the front air mixing door 16 can independently adjust temperature of air blown toward the front seat side in the passenger compartment by adjusting the flow amount ratio. Similarly, the rear air mixing door 39 can independently adjust temperature of air blown toward the rear seat side in the passenger compartment by adjusting the flow amount ratio.

The rotation shafts 16a, 39a of the two air mixing doors 16, 39 are rotatably supported in the air conditioning case 11. One end portions of the rotation shafts 16a, 39a protrude to the outside of the air conditioning case 11 to be respectively independently connected to operation mechanisms. Each of the operation mechanisms is constructed by an actuator mechanism using a motor or a manual operation mechanism.

Warm air from the rear passage 37 of the core portion of the heater core 13 and cool air passing through the rear cool air bypass passage 38 while bypassing the heater core 13 are mixed in a rear mixing portion 40, so that conditioned air having a predetermined temperature can be obtained.

A rear face opening portion 41 and two rear foot opening portions 42 are provided at a downstream side (e.g., vehicle rear side) of the rear air mixing portion 40. In the third embodiment, as shown in FIG. 6, the rear face opening portion 41 is provided at a center between the two rear foot opening portions 42 in the vehicle right-left direction on a rear downstream side portion of the air conditioning case 11. The rear face opening portion 41 is opened and closed by a rear face door 43, and the rear foot opening portions 42 are opened and closed by rear foot doors 44, as shown in FIG. 6. Further, the rear face door 43 and the two rear foot doors 44 are disposed to be rotated by a single rotation shaft 45. That is, the plural rear air-outlet mode switching doors 43, 44 are connected to the single rotation shaft 45 extending in the vehicle right-left direction, to be operatively linked with each other. Because attachment angles of the doors 43, 44 relative to the rotation shaft 45 are changed, rear opening/closing states of the rear opening portions 41 and 42 can be selectively switched by changing the rotation angle of the single rotation shaft 45, so that a rear air outlet mode can be selected. That is, by changing the rotation angle of the single rotation shaft 45, the rear air outlet mode such as a rear face mode, a rear foot mode, a rear bi-level mode and a rear shutting mode can be selectively set. In the rear face mode, the rear face opening portion 41 is opened, and the rear foot opening portions 42 are closed. In the rear foot mode, the rear face opening portion 41 is closed, and the rear foot opening portions 42 are opened. In the rear bi-level mode, the rear face opening portion 41 is opened, and the rear foot opening portions 42 are also opened. Further, in the rear shutting mode, the rear face opening portion 41 is closed, and the rear foot opening portions 42 are also closed.

The rear face opening portion 41 communicates with a rear face air outlet through a connection duct, so that conditioned air is blown toward the upper side of a passenger on a rear seat of the passenger compartment. The rear foot opening portion 42 communicates with a rear foot air outlet through a connection duct, so that conditioned air is blown toward the lower side of the passenger on the rear seat of the passenger compartment. FIG. 6 shows the rear foot mode where the rear face opening portion 41 is closed by the rear face door 43 and the rear foot openings 42 are opened by the rear foot doors 44.

The rotation shaft 45 of the rear air-outlet mode switching doors 43, 44 is rotatably held in the air conditioning case 11. One end of the rotation shaft 45 protrudes to an outside of the air conditioning case 11, and is connected to a driving mechanism.

A switching door 46 is disposed at a downstream air position of the heater core 13 at a lower side position opposite to the rear passage 37, and is rotated around a rotation shaft 46a. When the switching door 46 is operated to the solid line position in FIG. 7, the switching door 46 is positioned on an extending line of the partition member 35, so that the front passage 36 and the rear passage 37 of the heater core 13 are partitioned from each other, and a communication between the rear passage 37 of the heater core 13 and the front warm air passage 18 is interrupted. Accordingly, the solid line position of the switching door 46 is a partition position.

Figure 7:
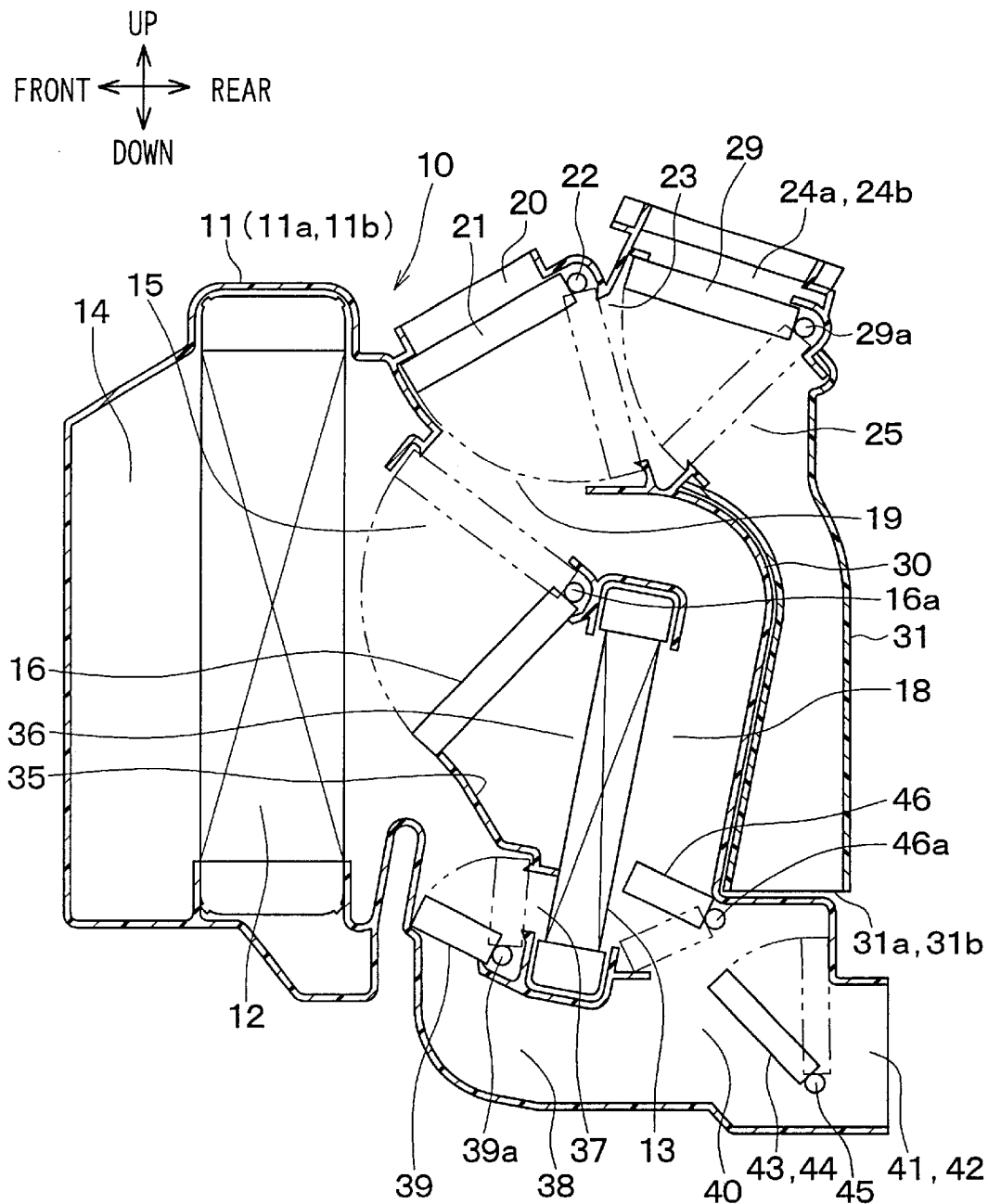
FIG. 7 is a schematic sectional view showing the air conditioning unit in FIG. 6.
Figure 8:
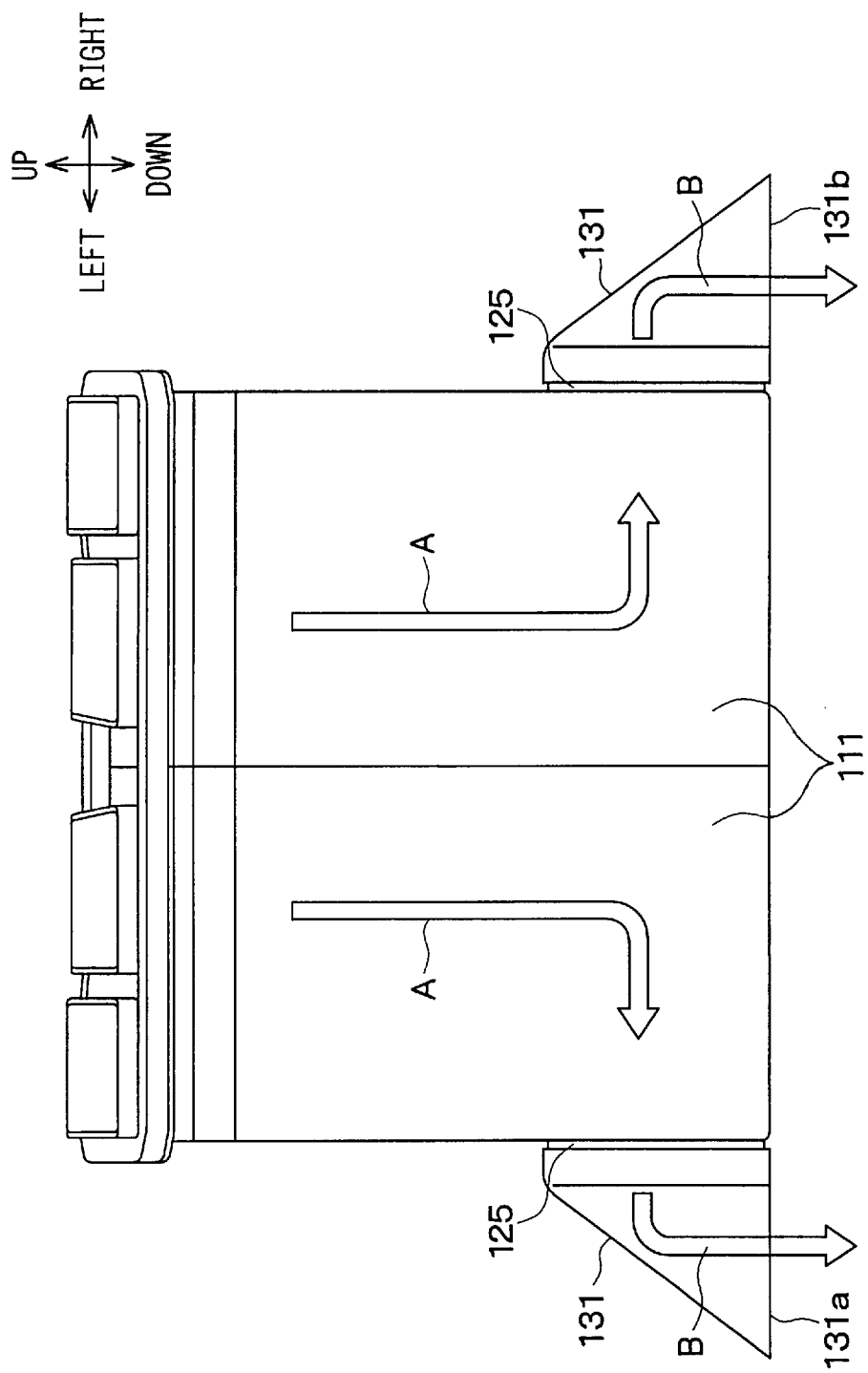
FIG. 8 is a schematic front view showing an air conditioning unit of a vehicle air conditioner in a related art.
Figure 9:
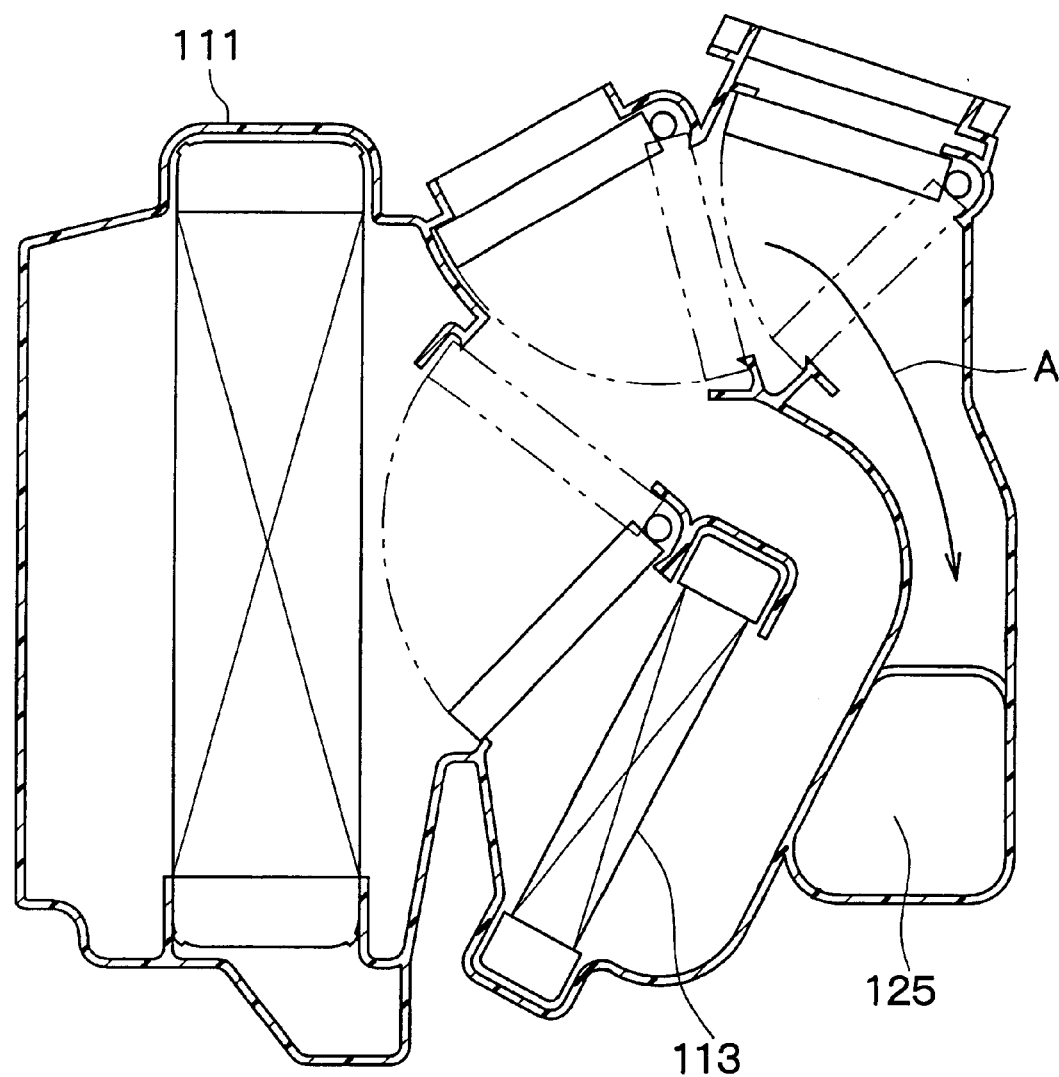
FIG. 9 is a schematic sectional view showing the air conditioning unit in FIG. 8.

On the other hand, when the switching door 46 is operated to the chain line position in FIG. 7, a communication between the rear passage 37 of the heater core 13 and the rear air mixing portion 40 is interrupted, and the rear passage 37 of the heater core 13 communicates with the front warm air passage 18. Accordingly, the chain line position of the switching door 46 in FIG. 7 is a rear shutting position.

The switching door 46 can be independently operated by an operation mechanism. Alternatively, the switching door 46 can be operatively linked with the rear air mixing door 39. In this case, when the rear air mixing door 39 is positioned to the maximum heating position shown by the solid line in FIG. 7, the switching door 46 is operatively linked to the rear air mixing door 39 to be positioned to the partition position. When the rear air mixing door 39 is positioned at the maximum cooling position shown by the chain line in FIG. 7, the switching door 46 is operatively linked with the rear air mixing door 39 to be positioned to the rear shutting position.

Figure 6:
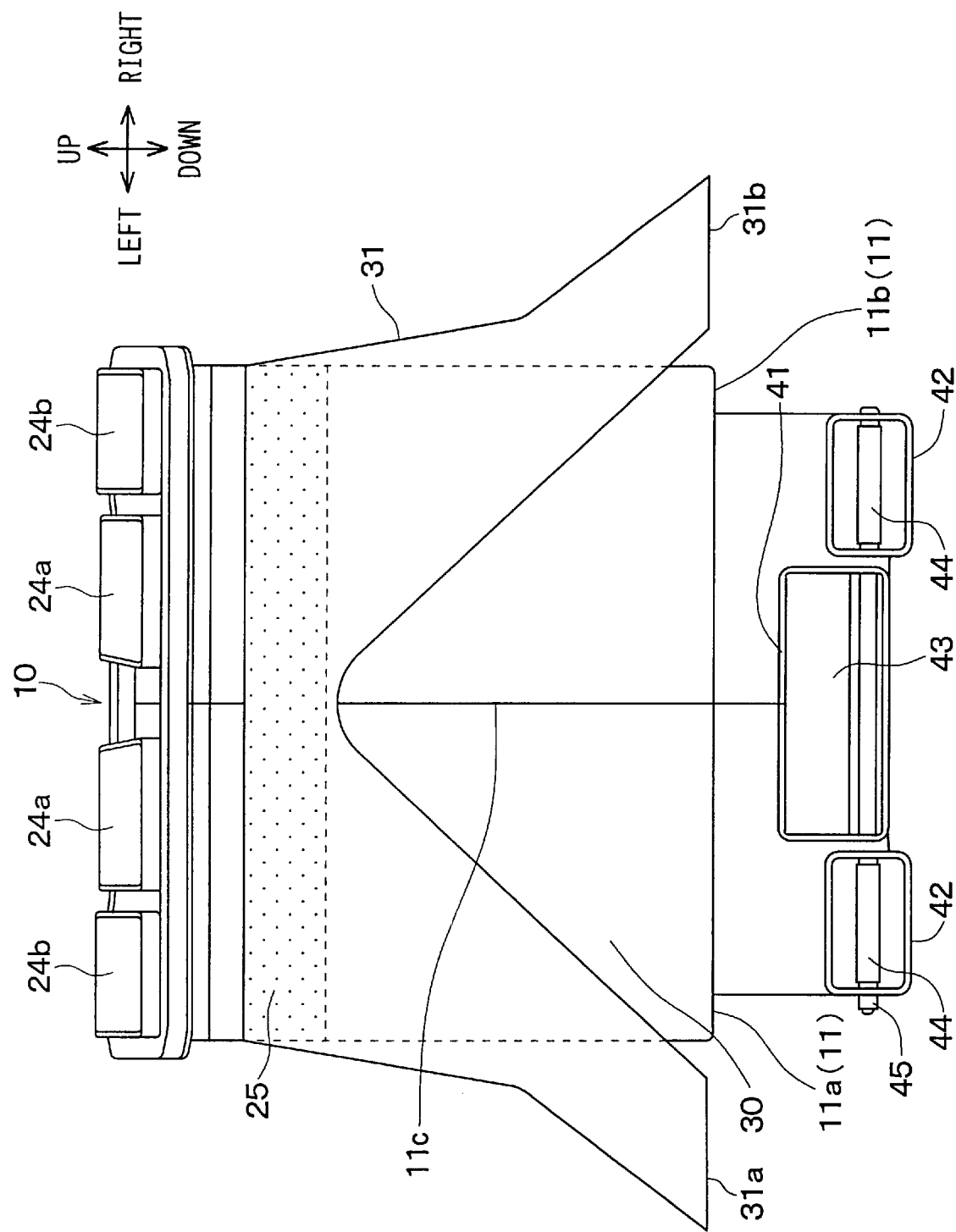
FIG. 6 is a schematic front view showing an air conditioning unit of a vehicle air conditioner according to a third preferred embodiment of the present invention.

In the third embodiment, as shown in FIG. 6, the structure of the front foot opening 25 and the foot air duct 31 is the same as that of the above-described first embodiment. Accordingly, even in the air conditioning unit 10 of the third embodiment, warm air can be uniformly blown toward the foot area in each front seat of the passenger compartment.

Although the present invention has been fully described in connection with the preferred embodiments thereof with reference to the accompanying drawings, it is to be noted that various changes and modifications will become apparent to those skilled in the art.

For example, in the above-described embodiments of the present invention, the foot air-outlet structure described in the first and second embodiments can be used for the other-type air conditioning unit.

Such changes and modifications are to be understood as being within the scope of the present invention as defined by the appended claims.

What is claimed is:

1. An air conditioner for a vehicle having a passenger compartment, the air conditioner comprising:
   an air conditioning case, having a wall surface extending in a vehicle width direction, for defining an air passage, the wall surface having an air opening portion at an upper side position, from which air in the air conditioning case is taken out toward a lower side in the passenger compartment;
   a heating heat exchanger for heating air, the heating heat exchanger being disposed in the air conditioning case to heat air to be blown into the air opening portion; and
   an air duct defining a foot passage through which air from the air opening portion flows toward the lower side of the passenger compartment, wherein:
   the air duct is connected to the wall surface at the air opening portion to communicate with the air opening portion, and has right and left tilt portions that extend downwardly to be tilted toward right and left sides in the vehicle width direction;
   the right and left tilt portions have lower end openings used as foot air outlets from which air introduced into the air duct is blown toward the lower side in the passenger compartment; and
   the air duct has an approximate reverse V shape such that the right and left tilt portions extend from the air opening portion of the wall surface downwardly to be tilted toward the right and left sides in the vehicle width direction.

2. The air conditioner according to claim 1, wherein:
   the wall surface extends in a vertical direction; and
   the air opening portion is provided in the wall surface at an upper side of the heating heat exchanger to be elongated in an entire area of the air conditioning case in the vehicle width direction.

3. The air conditioner according to claim 1, wherein the air duct is constructed by a member separated from the air conditioning case.

4. The air conditioner according to claim 1, wherein:
the air conditioning case is disposed at an approximate center in the vehicle width direction at a front portion in the passenger compartment, such that air flows in the air conditioning case from a vehicle front side toward a vehicle rear side; and
the wall surface is a rear wall surface on a vehicle rear side in the air conditioning case.

5. An air conditioner for a vehicle having a passenger compartment, the air conditioner comprising:
an air conditioning case, having a wall surface extending in a vehicle width direction, for defining an air passage, the wall surface having an air opening portion at an upper side position, from which air in the air conditioning case is taken out toward a lower side in the passenger compartment;
a heating heat exchanger for heating air, the heating heat exchanger being disposed in the air conditioning case to heat air to be blown into the air opening portion; and
an air duct defining a foot passage through which air from the air opening portion flows toward the lower side of the passenger compartment, wherein:
the air duct is connected to the wall surface at the air opening portion to communicate with the air opening portion, and has right and left tilt portions that extend downwardly to be tilted toward right and left sides in the vehicle width direction; and
the right and left tilt portions have lower end openings used as foot air outlets from which air introduced into the air duct is blown toward the lower side in the passenger compartment; and
the air duct is a front foot air duct through which air is blown toward the lower side on a front seat in the passenger compartment, the air conditioner further comprising
a rear foot duct through which air is blown toward the lower side on a rear seat in the passenger compartment,
wherein the rear foot air duct is connected to the wall surface at the air opening portion on a center area in the vehicle width direction.

6. The air conditioner according to claim 1, wherein:
the air opening portion is provided in the wall surface at a position higher than the heating heat exchanger in a vertical direction; and
the air duct extends at least from the portion of the wall surface, higher than the heating heat exchanger, downwardly to be tilted toward the right and left sides in the vehicle width direction.

7. An air conditioner for a vehicle having a passenger compartment, the air conditioner comprising:
an air conditioning case, having a wall surface extending in a vehicle width direction, for defining an air passage, the wall surface having an air opening portion at an upper side position, from which air in the air conditioning case is taken out toward a lower side in the passenger compartment;
a heating heat exchanger for heating air, the heating heat exchanger being disposed in the air conditioning case to heat air to be blown into the air opening portion; and
an air duct defining a foot passage through which air from the air opening portion flows toward the lower side of the passenger compartment, wherein:
the air duct is connected to the wall surface at the air opening portion to communicate with the air opening portion, and has right and left tilt portions that extend downwardly to be tilted toward right and left sides in the vehicle width direction; and
the right and left tilt portions have lower end openings used as foot air outlets from which air introduced into the air duct is blown toward the lower side in the passenger compartment;
the air opening portion is provided in the wall surface at a position higher than the heating heat exchanger in a vertical direction;
the air duct extends at least from the portion of the wall surface, higher than the heating heat exchanger, downwardly to be tilted toward the right and left sides in the vehicle width direction;
the air duct is connected to the wall surface of the air conditioning case at a connection position around the air opening portion; and
the air duct has a width dimension larger than a width dimension of the air opening portion in the vehicle width direction, at the connection portion.

8. The air conditioner according to claim 1, wherein the wall surface extends substantially in the vehicle width direction and in a vertical direction, at a vehicle rear side of the heating heat exchanger.

9. An air conditioner for a vehicle having a passenger compartment, the air conditioner comprising:
an air conditioning case, having a wall surface extending in a vehicle width direction, for defining an air passage, the wall surface having an air opening portion at an upper side position, from which air in the air conditioning case is taken out toward a lower side in the passenger compartment;
a heating heat exchanger for heating air, the heating heat exchanger being disposed in the air conditioning case to heat air to be blown into the air opening portion; and
an air duct defining a foot passage through which air from the air opening portion flows toward the lower side of the passenger compartment, wherein:
the air duct is connected to the wall surface at the air opening portion to communicate with the air opening portion, and has right and left tilt portions that extend downwardly to be tilted toward right and left sides in the vehicle width direction; and
the right and left tilt portions have lower end openings used as foot air outlets from which air introduced into the air duct is blown toward the lower side in the passenger compartment;
the air duct has a connection portion connected to the wall surface to communicate with the air opening portion;
the connection portion of the air duct extends in the vehicle width direction to have a width dimension equal to or larger than a width dimension of the air opening portion; and
the right and left tilt portions extend from the connection portion, and are branched from each other to be tilted toward the right and left sides relative to a vertical direction.

10. The air conditioner according to claim 5, wherein:
the wall surface extends in a vertical direction; and
the air opening portion is provided in the wall surface at an upper side of the heating heat exchanger to be elongated in an entire area of the air conditioning case in the vehicle width direction.

11. The air conditioner according to claim 5, wherein the air duct is constructed by a member separated from the air conditioning case.

12. The air conditioner according to claim 5, wherein:

the air conditioning case is disposed at an approximate center in the vehicle width direction at a front portion in the passenger compartment, such that air flows in the air conditioning case from a vehicle front side toward a vehicle rear side; and the wall surface is a rear wall surface on a vehicle rear side in the air conditioning case.

13. The air conditioner according to claim 5, wherein:

the air opening portion is provided in the wall surface at a position upper higher than the heating heat exchanger in a vertical direction; and the air duct extends at least from the portion of the wall surface, upper higher than the heating heat exchanger, downwardly to be tilted toward the right and left sides in the vehicle width direction.

14. The air conditioner according to claim 5, wherein the wall surface extends substantially in the vehicle width direction and in a vertical direction, at a vehicle rear side of the heating heat exchanger.

15. The air conditioner according to claim 7, wherein:

the wall surface extends in the vertical direction; and the air opening portion is elongated in an entire area of the air conditioning case in the vehicle width direction.

16. The air conditioner according to claim 7, wherein the air duct is constructed by a member separated from the air conditioning case.

17. The air conditioner according to claim 7, wherein:

the air conditioning case is disposed at an approximate center in the vehicle width direction at a front portion in the passenger compartment, such that air flows in the air conditioning case from a vehicle front side toward a vehicle rear side; and the wall surface is a rear wall surface on a vehicle rear side in the air conditioning case.

18. The air conditioner according to claim 5, wherein the wall surface extends substantially in the vehicle width direction and in the vertical direction, at a vehicle rear side of the heating heat exchanger.

19. The air conditioner according to claim 9, wherein:

the wall surface extends in a vertical direction; and the air opening portion is provided in the wall surface at an upper side of the heating heat exchanger to be elongated in an entire area of the air conditioning case in the vehicle width direction.

20. The air conditioner according to claim 9, wherein the air duct is constructed by a member separated from the air conditioning case.

21. The air conditioner according to claim 9, wherein:

the air conditioning case is disposed at an approximate center in the vehicle width direction at a front portion in the passenger compartment, such that air flows in the air conditioning case from a vehicle front side toward a vehicle rear side; and the wall surface is a rear wall surface on a vehicle rear side in the air conditioning case.

22. The air conditioner according to claim 9, wherein:

the air opening portion is provided in the wall surface at a position upper higher than the heating heat exchanger in a vertical direction; and the air duct extends at least from the portion of the wall surface, upper higher than the heating heat exchanger, downwardly to be tilted toward the right and left sides in the vehicle width direction.

23. The air conditioner according to claim 9, wherein the wall surface extends substantially in the vehicle width direction and in a vertical direction, at a vehicle rear side of the heating heat exchanger.

* * * * *